US012734830B2

(12) United States Patent
Kobayashi et al.

(10) Patent No.: US 12,734,830 B2
(45) Date of Patent: Sep. 15, 2026

(54) LIQUID EJECTION DEVICE AND METHOD OF CONTROLLING LIQUID EJECTION DEVICE

(71) Applicant: SEIKO EPSON CORPORATION, Tokyo (JP)

(72) Inventors: Satoru Kobayashi, Shiojiri (JP); Masaaki Ando, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 18/637,663

(22) Filed: Apr. 17, 2024

(65) Prior Publication Data

US 2024/0351350 A1 Oct. 24, 2024

(30) Foreign Application Priority Data

Apr. 20, 2023 (JP) ................................ 2023-069085

(51) Int. Cl.

*B41J 2/165* (2006.01)
*B41J 3/407* (2006.01)
*B41J 11/00* (2006.01)
*D06B 1/02* (2006.01)
*D06B 21/00* (2006.01)
*D06B 23/30* (2006.01)
*D06P 5/30* (2006.01)

(52) U.S. Cl.

CPC ......... *B41J 3/4078* (2013.01); *B41J 2/16508* (2013.01); *B41J 11/002* (2013.01); *D06B 1/02* (2013.01); *D06B 21/00* (2013.01); *D06B 23/30* (2013.01); *D06P 5/30* (2013.01); *B41P 2235/20* (2013.01); *B41P 2235/27* (2013.01); *D10B 2401/021* (2013.01)

(58) Field of Classification Search

None

See application file for complete search history.

(56) References Cited

U.S. PATENT DOCUMENTS 5,476,518 A * 12/1995 Caleshu ................ D06P 1/6735 8/488
8,622,514 B2 * 1/2014 Inoue .................. B41J 2/16585 347/34
2008/0007592 A1 1/2008 Watanabe
2014/0097267 A1 4/2014 Shitara
2023/0313451 A1 * 10/2023 Yamada ................ D06P 1/5278 347/21

FOREIGN PATENT DOCUMENTS

EP 4292820 A 12/2023
JP 2008-012826 A 1/2008
JP 2015-027657 A 2/2015
JP 2014-159118 A 9/2019
WO WO2022/208702 A 6/2022

* cited by examiner

*Primary Examiner* — Alejandro Valencia
(74) *Attorney, Agent, or Firm* — WORKMAN NYDEGGER

(57) ABSTRACT

A liquid ejection device includes a liquid ejection unit having a first nozzle group configured to eject a first liquid to a cloth conveyed, and a second nozzle group configured to eject a second liquid to the cloth, and a wiping unit configured to wipe a nozzle surface on which the first nozzle group is disposed, wherein the first liquid is aqueous ink and the second liquid is a liquid including a softening agent, and the second nozzle group executes a softening treatment of ejecting the second liquid to the cloth, and a water repellent treatment of making the second liquid adhere to the nozzle surface.

13 Claims, 5 Drawing Sheets

LIQUID EJECTION DEVICE AND METHOD OF CONTROLLING LIQUID EJECTION DEVICE

The present application is based on, and claims priority from JP Application Serial Number 2023-069085, filed Apr. 20, 2023, the disclosure of which is hereby incorporated by reference herein in its entirety.

BACKGROUND

1. Technical Field

The present disclosure relates to a liquid ejection device such as a printer, and a method of controlling the liquid ejection device.

2. Related Art

There has been a printer as an example of a liquid ejection device for ejecting ink as an example of a liquid from a recording head to perform printing as in, for example, JP-A-2008-12826. The printer is equipped with a wiping member for wiping a nozzle surface of the recording head. The nozzle surface is treated with a water repellent treatment.

The water repellency of the nozzle surface degrades with, for example, wiping in some cases. When the water repellency degrades, it becomes easy for the liquid to remain on the nozzle surface even when wiping the nozzle surface.

SUMMARY

A liquid ejection device configured to solve the problem described above includes a liquid ejection unit having a first nozzle group configured to eject a first liquid to a cloth conveyed, and a second nozzle group configured to eject a second liquid to the cloth, and a wiping unit configured to wipe a nozzle surface on which is aqueous ink and the second liquid is a liquid including a softening agent, and the second nozzle group is configured to execute a softening treatment of ejecting the second liquid to the cloth, and a water repellent treatment of making the second liquid adhere to the nozzle surface.

A method of controlling a liquid ejection device configured to solve the problem described above, the liquid ejection device including a liquid ejection unit having a first nozzle group configured to eject a first liquid to a cloth conveyed, and a second nozzle group configured to eject a second liquid to the cloth, and a wiping unit configured to wipe a nozzle surface on which the first nozzle group is disposed, wherein the first liquid is aqueous ink and the second liquid is a liquid including a softening agent, includes executing, by the second nozzle group, a softening treatment of ejecting the second liquid to the cloth, and executing, by the second nozzle group, a water repellent treatment of ejecting the second liquid to make the second liquid adhere to the nozzle surface.

DESCRIPTION OF EMBODIMENTS

First Embodiment

Figure 1:
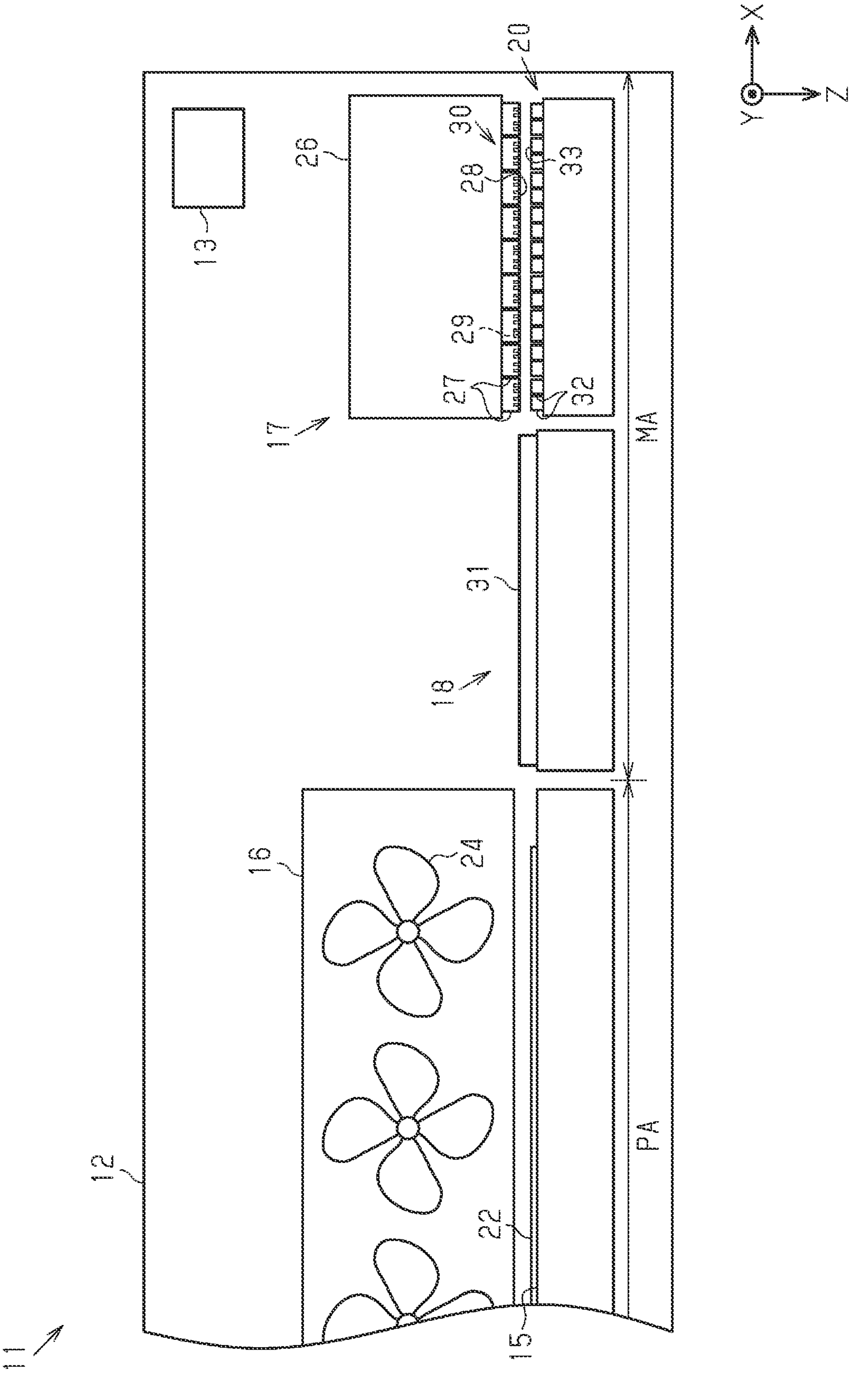
FIG. 1 is a schematic diagram of a first embodiment of a liquid ejection device.

A liquid ejection device and a method of controlling the liquid ejection device according to an embodiment will hereinafter be described with reference to the drawings. The liquid ejection device is, for example, a printer of an inkjet type for printing an image such as a character or a photograph by ejecting ink as an example of a liquid on a cloth.

In the drawings, the gravitational direction is represented by a Z axis, and directions along a horizontal plane are represented as an X-axis and a Y-axis assuming that a liquid ejection device 11 is provided on the horizontal plane. The X axis, the Y axis, and the Z axis are perpendicular to each other.

Liquid Ejection Device

As shown in FIG. 1, the liquid ejection device 11 is provided with a chassis 12 and a controller 13.

The chassis 12 houses a variety of elements provided to the liquid ejection device 11.

The controller 13 performs overall control of the drive of each mechanism in the liquid ejection device 11 to control a variety of operations executed by the liquid ejection device 11.

The controller 13 can be configured as a circuit including a: one or more processors for executing a variety of types of processing with a computer program, B: one of more dedicated hardware circuits for executing at least some of the variety of types of processing, or y: a combination of a and B. The hardware circuit is, for example, an application specific integrated circuit. The processor includes a CPU, and memory devices such as a RAM and a ROM, and the memory devices store program codes or commands configured so as to make the CPU execute the processing. The memory devices, namely computer readable media, include all types of readable media which can be accessed by a general-purpose or dedicated computer.

The liquid ejection device 11 can be provided with a conveying belt 15 and a drying unit 16. The liquid ejection device 11 is provided with a liquid ejection unit 17 and a wiping unit 18. The liquid ejection device 11 can be provided with a capping unit 20.

The conveying belt 15 and the drying unit 16 can be disposed in a print area PA. The print area PA is an area where printing is performed on a cloth 22. The wiping unit 18 and the capping unit 20 can be disposed in a maintenance area MA. The maintenance area MA is an area where the maintenance of the liquid ejection unit 17 is performed. The print area PA and the maintenance area MA are disposed side by side in a scanning direction X. The scanning direction X can be a direction parallel to the X axis.

The conveying belt 15 is configured so as to support the cloth 22. The conveying belt 15 is, for example, an annular belt. The conveying belt 15 rotates to thereby convey the cloth 22 in a conveying direction Y. The conveying direction Y can be a direction parallel to the Y axis.

The drying unit 16 can be provided with one or more fans 24. The drying unit 16 generates an airflow. The drying unit 16 in the present embodiment is provided with the plurality of fans 24. The plurality of fans 24 can be disposed side by side in the scanning direction X. The drying unit 16 can be disposed above the conveying belt 15. The drying unit 16 can be disposed at a larger distance than the thickness of the cloth 22 from the conveying belt 15. The drying unit 16 can be disposed at an upstream position in the conveying direction Y with respect to the liquid ejection unit 17.

The liquid ejection unit 17 is capable of ejecting a liquid to the cloth 22 conveyed. The liquid ejection unit 17 can be provided with a carriage 26 and one or more heads 27. The heads 27 are mounted on the carriage 26.

The carriage 26 is capable of reciprocating in the scanning direction X. The carriage 26 moves the heads 27 across the print area PA and the maintenance area MA.

The heads 27 each have a nozzle surface 28. On the nozzle surface 28, there opens a plurality of nozzles 29. In the plurality of nozzles 29, an aggregate of the nozzles 29 which eject the same type of liquid is also referred to as a nozzle group 30. The liquid ejection unit 17 has a plurality of the nozzle groups 30. It is possible for the plurality of nozzle groups 30 to eject respective liquids different from each other. At least two of the nozzle groups 30 can eject the same liquid.

The wiping unit 18 is configured to wipe the nozzle surface 28. It is possible for the wiping unit 18 to be provided with a wiper 31. The wiper 31 can wipe the plurality of heads 27 one by one, or can also wipe the plurality of heads 27 in a lump. The wiper 31 can be, for example, a belt-like member capable of absorbing the liquid. The wiping unit 18 reciprocates the wiper 31 in the conveying direction Y to thereby perform the wiping.

The capping unit 20 is provided with one or more caps 32. The capping unit 20 can be provided with a plurality of caps 32 for each of the heads 27. The capping unit 20 can be provided with the same number of caps 32 as the number of the heads 27, or can be provided with a single cap 32 for a plurality of the heads 27.

The caps 32 each have a lip part 33. The lip part 33 is capable of having contact with the liquid ejection unit 17. The capping unit 20 moves the caps 32 to a separated position shown in FIG. 1 and a capping position shown in FIG. 4.

The separated position is a position where the lip parts 33 are at a distance from the liquid ejection unit 17. When the caps 32 are located at the separated position, a gap is formed between the caps 32 and the nozzle surfaces 28.

The capping position is a position above the separated position. When the caps 32 are located at the capping position, the lip parts 33 have contact with the nozzle surfaces 28. The capping position is a position where the caps 32 cap the heads 27.

Heads

The heads 27 are each formed so as to eject the liquid. The cloth 22 is scanned with the heads 27. The heads 27 performs printing on the cloth 22 in the print area PA. The heads 27 eject the liquid while moving in the scanning direction X to thereby perform printing on the cloth 22 supported by the conveying belt 15. The heads 27 eject the liquid to the cloth 22 in a state in which conveying of the cloth 22 is stopped. The liquid ejection device 11 according to the present embodiment is a serial printer.

Figure 2:
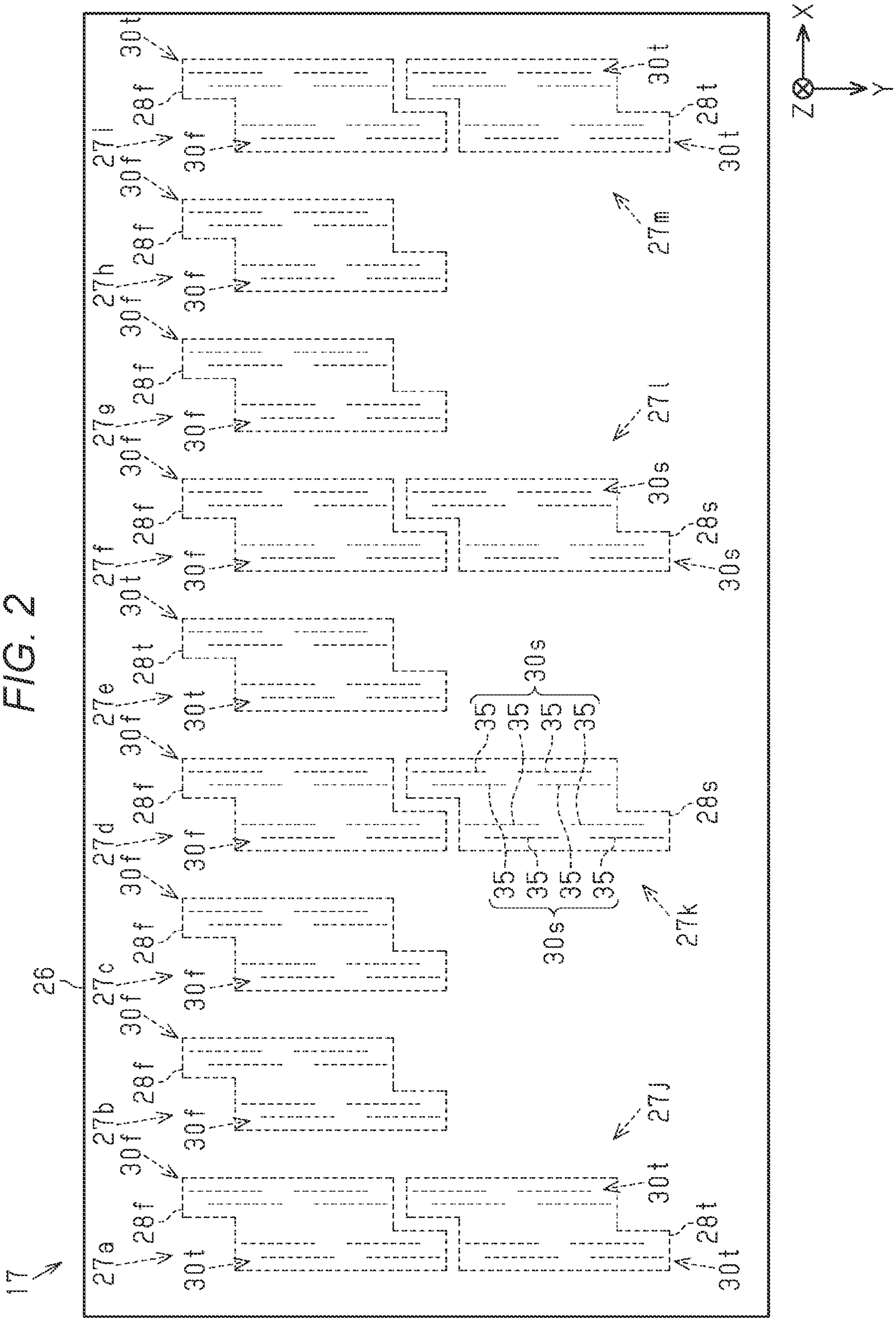
FIG. 2 is a schematic diagram of a liquid ejection unit.

As shown in FIG. 2, the liquid ejection unit 17 in the present embodiment is provided with thirteen heads 27. When discriminating the plurality of heads 27 from each other, the thirteen heads 27 are also referred to as a 1-st head **27*a* through a 13-th head 27*m*. It is possible for the 1-st head 27*a* through the 9-th head 27*i* to be disposed side by side in the scanning direction X. It is possible for the 10-th head 27*j* through the 13-th head 27*m* to be disposed side by side in the scanning direction X. The 10-th head 27*j* through the 13-th head 27*m* can be disposed downstream in the conveying direction Y of the 1-st head 27*a* through the 9-th head 27*i***.

It is possible for the 1-st head **27*a* through the 10-th head 27*i* to be disposed side by side in the conveying direction Y. It is possible for the 4-th head 27*d* and the 11-th head 27*k* to be disposed side by side in the conveying direction Y. It is possible for the 6-th head 27*f* and the 12-th head 27*l* to be disposed side by side in the conveying direction Y. It is possible for the 9-th head 27*i* and the 13-th head 27*m*** to be disposed side by side in the conveying direction Y.

In the present embodiment, the plurality of nozzle groups 30 provided to the liquid ejection unit 17 is also referred to as a first nozzle group **30*f*, a second nozzle group 30*s*, and the third nozzle group 30*t*. In other words, the liquid ejection unit 17 has one or more first nozzle groups 30*f* and one or more second nozzle groups 30*s*. The liquid ejection unit 17 can have one or more third nozzle groups 30*t*. One of the heads 27 in the present embodiment has two of the first nozzle group 30*f*, the second nozzle group 30*s*, and the third nozzle group 30*t***.

The nozzle group 30 can have one or more nozzle arrays 35. The nozzle arrays 35 are each formed of the plurality of nozzles 29 arranged in the conveying direction Y. In the present embodiment, the nozzle group 30 is configured with four nozzle arrays 35. The four nozzle arrays 35 constituting each of the nozzle groups 30 are located so as to be shifted in the scanning direction X and the conveying direction Y from each other.

In the present embodiment, the nozzle surface 28 provided with at least one first nozzle group **30*f* is also referred to as a first nozzle surface 28*f*. In the present embodiment, the nozzle surface 28 provided with at least one second nozzle group 30*s* is also referred to as a second nozzle surface 28*s*. The first nozzle group 30*f* and the second nozzle group 30*s* of the present embodiment are disposed on the respective nozzle surfaces 28 different from each other. In the present embodiment, the nozzle surface 28 provided only with the third nozzle group 30*t* is also referred to as a third nozzle surface 28*t***.

For example, the 1-st head **27*a* and the 9-th head 27*i* each have the first nozzle group 30*f* and the third nozzle group 30*t*. The third nozzle group 30*t* can be located at an outer side of the first nozzle group 30*f*. For example, the 2-nd head 27*b* through the 4-th head 27*d*, and the 6-th head 27*f* through the 8-th head 27*h* each have two first nozzle groups 30*f*. Therefore, the 1-st head 27*a* through the 4-th head 27*d*, and the 6-th head 27*f* through the 9-th head 27*i* each have the first nozzle surface 28*f***.

For example, the 5-th head **27*e*, the 10-th head 27*j*, and the 13-th head 27*m* each have two third nozzle groups 30*t*. Therefore, the 5-th head 27*e*, the 10-th head 27*j*, and the 13-th head 27*m* each have the third nozzle surface 28*t***.

For example, the 11-th head **27*k* and the 12-th head 27*l* each have two second nozzle groups 30*s*. Therefore, the 11-th head 27*k* and the 12-th head 27*l* each have the second nozzle surface 28*s***.

The first nozzle group **30*f* is capable of ejecting a first liquid. The first liquid is water-based ink. The first liquid is, for example, ink constituting a color of an image to be printed on the cloth 22. The first liquid is, for example, pigment ink. It is possible for the plurality of first nozzle groups 30*f*** to be able to eject respective colors of ink different from each other.

It is possible for at least one of the nozzle groups 30 to be able to eject the ink including an inorganic pigment as the first liquid. As the ink including the inorganic pigment, there can be cited, for example, carbon black or titanium white.

In the present embodiment, at least one first nozzle group 30*f* provided to the 4-th head 27*d* and the 6-th head 27*f* ejects the first liquid including the inorganic pigment. Inn the present embodiment, the first nozzle group 30*f* provided to the 1-st head 27*a* through the 3-rd head 27*c*, and the 7-th head 27*g* through the 9-th head 27*i* ejects the first liquid which does not include the inorganic pigment.

The second nozzle group 30*s* is capable of ejecting a second liquid. The second liquid is a liquid including a softening agent. The softening agent is not particularly limited providing the softening agent can provide flexibility and water repellency, but a silicone compound is preferable as the softening agent. As an example of the silicone compound, there can be cited dimethyl silicone oil. The second nozzle group 30*s* is capable of executing a softening treatment of ejecting the second liquid to the cloth 22, and a water repellent treatment of making the second liquid adhere to the nozzle surfaces 28. By performing the softening treatment, it is possible to enhance a chromogenic property of the image to be printed.

For example, the 11-th head 27*k* for ejecting the second liquid is disposed downstream in the conveying direction Y of the 4-th head 27*d* capable of ejecting the first liquid including the inorganic pigment. The 4-th head 27*d* is disposed side by side in the scanning direction X with the 1-st head 27*a* through the 3-rd head 27*c*, and the 7-th head 27*g* through the 9-th head 27*i* capable of ejecting the first liquid which does not include the inorganic pigment. In other words, the 11-th head 27*k* is disposed at a position closer to the 4-th head 27*d* than to the 1-st head 27*a* through the 3-rd head 27*c*, and the 7-th head 27*g* through the 9-th head 27*i*. In other words, the second nozzle group 30*s* of the 11-th head 27*k* is arranged at a position closer to the first nozzle group 30*f* of the 4-th head 27*d* capable of ejecting the first liquid including the inorganic pigment than to the first nozzle groups 30*f* provided to the 1-st head 27*a* through the 3-rd head 27*c*, and the 7-th head 27*g* through the 9-th head 27*i* capable of ejecting the first liquid which does not include the inorganic pigment.

Similarly, the 12-th head 27*l* for ejecting the second liquid is disposed downstream in the conveying direction Y of the 6-th head 27*f* capable of ejecting the first liquid including the inorganic pigment. The second nozzle group 30*s* of the 12-th head 27*l* is arranged at a position closer to the first nozzle group 30*f* provided to the 6-th head 27*f* capable of ejecting the first liquid including the inorganic pigment than to the first nozzle groups 30*f* provided to the 1-st head 27*a* through the 3-rd head 27*c*, and the 7-th head 27*g* through the 9-th head 27*i* capable of ejecting the first liquid which does not include the inorganic pigment.

The third nozzle group 30*t* is capable of ejecting a third liquid. The third liquid can be a liquid including a component of hardening the first liquid, or can also be a liquid including a component of protecting the first liquid which has adhered to the cloth 22.

Softening Treatment

The controller 13 executes the softening treatment of the second nozzle group 30*s* ejecting the second liquid to the cloth 22. The softening treatment can be executed together with the printing on the cloth 22 with the first liquid. The liquid ejection unit 17 performs the softening treatment by ejecting the second liquid while reciprocating in the scanning direction X in the print area PA.

Water Repellent Treatment

The controller 13 can execute the water repellent treatment of the second nozzle group 30*s* ejecting the second liquid to adhere to the nozzle surfaces 28. The water repellent treatment can be executed at timing different from that of the printing on the cloth 22. The liquid ejection unit 17 performs the water repellent treatment by ejecting the second liquid in the state in which the liquid ejection unit 17 stops in the maintenance area MA.

The controller 13 ejects the second liquid from the second nozzle groups 30*s*. Parameters for ejecting the second liquid from the second nozzle groups 30*s* can be different between the softening treatment and the water repellent treatment. In other words, it is possible for the controller 13 to make the parameters such as a magnitude of a voltage to be applied to a piezoelectric element not shown, duration of an application of the voltage, and timing of applying the voltage different between the softening treatment and the water repellent treatment.

When the voltage is applied to the piezoelectric element, the nozzle 29 ejects a large droplet and an atomized small droplet. The large droplet flies in a perpendicular direction to the nozzle surfaces 28 so as to get away from the nozzle surfaces 28. The small droplet is suspended around the nozzle 29. The atomized small droplets are also referred to as mist.

The parameters with which the mist is apt to occur change in accordance with mechanical conditions such as a size of the nozzle 29 and a structure of the head 27, liquid conditions such as viscosity, density, a specific weight of the liquid, environmental conditions such as temperature, moisture, and atmospheric pressure, and so on. The parameters can be set in advance based on at least one condition. It is possible for the controller 13 to execute the ejection of the liquid with the parameters set in advance.

It is possible for the controller 13 to execute the softening treatment by ejecting the second liquid with the parameters with which the mist is difficult to occur. It is possible for the controller 13 to execute the water repellent treatment by ejecting the second liquid with the parameters with which the mist is apt to occur. It is possible for the second nozzle groups 30*s* to perform the water repellent treatment with the atomized second liquid thus ejected.

The water repellent treatment can be performed in a state in which the liquid ejection unit 17 is located above the capping unit 20, and at the same time, the caps 32 are located at the separated position. The atomized second liquid adheres to the nozzle surfaces 28, the lip parts 33, and so on while floating in a space between the liquid ejection unit 17 and the caps 32. Specifically, the second nozzle groups 30*s* make the second liquid adhere to the first nozzle surfaces 28*f* on which the first nozzle groups 30*f* are disposed. It is possible for the second nozzle groups 30*s* to make the second liquid adhere to the second nozzle surfaces 28*s* and the third nozzle surfaces 28*t*. It is possible for the second nozzle groups 30*s* to make the second liquid adhere to the lip parts 33. It is possible for the second nozzle groups 30*s* to perform the water repellent treatment on the nozzle surfaces 28 and the lip parts 33.

The controller 13 can drive the fans 24 when performing the water repellent treatment. The controller 13 can make the atomized second liquid pervade the plurality of heads 27 and the plurality of caps 32 by generating an airflow.

It is possible for the wiping unit 18 to wipe the nozzle surfaces 28 after the water repellent treatment, and before the first nozzle groups 30*f* eject the first liquid on the cloth 22. The controller 13 locates the liquid ejection unit 17 above the wiping unit 18, and at the same time, reciprocates the wiper 31 in the conveying direction Y. The wiping unit 18 wipes the first nozzle surfaces 28*f*, the second nozzle surfaces 28*s*, and the third nozzle surfaces 28*t*.

For example, when the second liquid adheres to a part of the nozzle surface 28, it is possible to spread the second liquid by wiping. When the second liquid adheres superfluously to the nozzle surface 28, it is possible to wipe out the second liquid by wiping. In other words, by performing the wiping before the second liquid dries, it is possible to reduce an unevenness of the water repellency on the nozzle surface 28.

It is possible for the controller 13 to dry the second liquid which has adhered to the nozzle surfaces 28 with the drying unit 16. The drying of the second liquid can be performed in a state in which the heads 27 are capped. The controller 13 locates the liquid ejection unit 17 above the capping unit 20, and at the same time, locates the caps 32 at the capping position. The caps 32 each have contact with the liquid ejection unit 17 to thereby surround a space in which at least one of the first nozzle group 30*f*, the second nozzle group 30*s*, and the third nozzle group 30*t* opens. In other words, it is possible for the drying unit 16 to make the airflow blow the liquid ejection unit 17 in the state in which the nozzles 29 are protected by the caps 32.

Functions of First Embodiment

The functions of the present embodiment will be described.

The atomized second liquid ejected by the second nozzle groups 30*s* adheres the nozzle surfaces 28, the lip parts 33, and so on. The second liquid spreads wetting the nozzle surfaces 28 or the surfaces of the lip parts 33 while the droplets of the second liquid are combined with each other. Therefore, by the second liquid drying, a water repellent film is formed on the nozzle surfaces 28 and the surfaces of the lip parts 33.

Advantages of First Embodiment

Advantages of the present embodiment will be described.

(1-1) The second nozzle groups 30*s* eject the second liquid to thereby execute the softening treatment of the cloth 22 and the water repellent treatment of the first nozzle surfaces 28*f* on which the first nozzle groups 30*f* are disposed. Therefore, it is possible to prevent the deterioration of the water repellency of the nozzle surfaces 28.

(1-2) The second nozzle groups 30*s* perform the water repellent treatment with the atomized second liquid. Since the atomized second liquid is easy to float, it is possible to easily perform the water repellent treatment in a broad range.

(1-3) The easiness of mist generation changes with, for example, the parameters for ejecting the second liquid. The parameters for ejecting the second liquid from the second nozzle groups 30*s* in the softening treatment, and the parameters for ejecting the liquid from the second nozzle groups 30*s* in the water repellent treatment are different from each other. It is possible for the second nozzle groups 30*s* to eject the second liquid in the ways of ejection suitable for the respective treatments.

(1-4) The wiping unit 18 wipes the nozzle surfaces 28 after performing the water repellent treatment, and before the first nozzle groups 30*f* eject the first liquid. The second liquid having adhered to the nozzle surfaces 28 is spread by the wiping. Therefore, it is possible to perform the ejection of the first liquid in the state in which the water repellency of the nozzle surfaces 28 is enhanced.

(1-5) When the caps 32 make contact with the liquid ejection unit 17, there is a possibility that the liquid ejection unit 17 gets dirty with the first liquid having adhered to the lip parts 33. In this regard, by making the second liquid adhere to the lip parts 33, it is possible to enhance the water repellency of the lip parts 33. Therefore, it is possible to reduce the first liquid which adheres to the lip parts 33.

(1-6) The first liquid including the inorganic pigment is more apt to deteriorate the water repellency of the nozzle surfaces 28 than the first liquid which does not include the inorganic pigment. In this regard, the second nozzle groups 30*s* are disposed at the position closer to the first nozzle groups 30*f* capable of ejecting the first liquid including the inorganic pigment than to the first nozzle groups 30*f* capable of ejecting the first liquid which does not include the inorganic pigment. Therefore, it is possible to make it easy to efficiently perform the water repellent treatment on a portion the water repellency of which easily deteriorates.

(1-7) The drying unit 16 dries the second liquid which has adhered to the nozzle surfaces 28, and is therefore capable of easily entrenching a water repellent component in the second liquid on the nozzle surfaces 28.

Second Embodiment

Then, a liquid ejection device and a method of controlling a liquid ejection device according to a second embodiment will be described with reference to the drawings. It should be noted that the second embodiment is different in the point that a cleaning mechanism is provided from the case of the first embodiment. Further, since the second embodiment is substantially the same in other points as the first embodiment, the same elements are denoted by the same symbols to thereby omit the redundant description.

Figure 3:
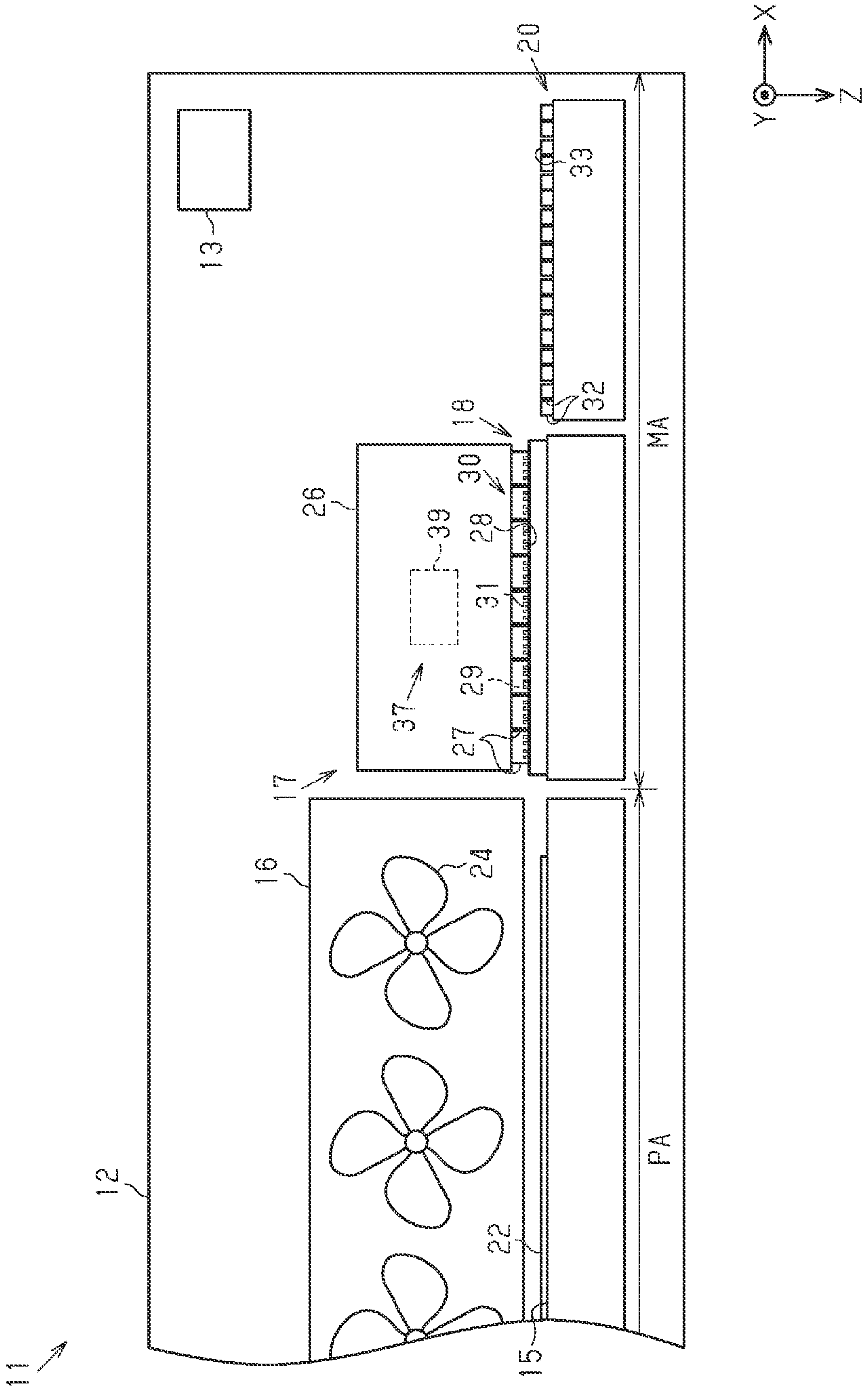
FIG. 3 is a schematic diagram of a second embodiment of the liquid ejection device.

As shown in FIG. 3, the liquid ejection device 11 can be provided with the cleaning mechanism 37. The cleaning mechanism 37 can have a pressure mechanism 39. The pressure mechanism 39 is capable of supplying a pressurized liquid to the one or more heads 27. The pressure mechanism 39 pressurizes the liquid in the liquid ejection unit 17 to thereby discharge the liquid from the heads 27. It is possible for the pressure mechanism 39 to, for example, discharge the liquid from the plurality of heads 27 in a lump. It is possible for the pressure mechanism 39 to discharge the liquid from each of the heads 27. It is possible for the pressure mechanism 39 to discharge the liquid from each of the nozzle groups 30.

The cleaning mechanism 37 discharges the first liquid from the first nozzle groups 30*f*. The cleaning mechanism 37 discharges the second liquid from the second nozzle groups 30*s*. The cleaning mechanism 37 discharges the third liquid from the third nozzle groups 30*t*.

Functions of Second Embodiment

The functions of the present embodiment will be described.

When performing the water repellent treatment, the cleaning mechanism 37 discharges the second liquid to make the second liquid adhere to the second nozzle surfaces 28*s*. Specifically, the pressure mechanism 39 pressurizes the second liquid to discharge the second liquid from the second nozzle groups 30*s*. The pressure mechanism 39 overflows the second liquid from the nozzles 29. The second liquid having overflowed from the nozzles 29 spreads along the second nozzle surface 28*s* to wet the second nozzle surface 28*s*. The water repellent treatment can be performed in the state in which the liquid ejection unit 17 is located above the wiping unit 18.

It is possible for the wiping unit 18 to move from the downstream in the conveying direction Y toward the upstream to thereby wipe the nozzle surfaces 28. It is possible for the wiping unit 18 to wipe the first nozzle surfaces 28*f* after wiping the second nozzle surfaces 28*s*.

When wiping the second nozzle surfaces 28*s*, the second liquid adheres to the wiper 31. It is possible to perform the water repellent treatment on some of the plurality of first nozzle surfaces 28*f*. For example, it is possible to perform the water repellent treatment on the first nozzle surfaces 28*f* provided to the 4-th head 27*d* and the 6-th head for ejecting the first liquid including the inorganic pigment. By wiping the first nozzle surfaces 28*f* with the wiper 31 to which the second liquid has adhered, it is possible to apply the second liquid to the first nozzle surfaces 28*f*. In other words, it is possible to perform the water repellent treatment of the first nozzle surfaces 28*f* by performing wiping.

It is possible for the controller 13 to dry the second liquid which has adhered to the nozzle surfaces 28 with the drying unit 16 after performing the water repellent treatment. The drying of the second liquid can be performed in the state in which the heads 27 are capped.

It is possible for the controller 13 to perform the water repellent treatment of ejecting the second liquid from the second nozzle groups 30*s* and the water repellent treatment of discharging the second liquid from the second nozzle groups 30*s* at any timing. For example, it is possible for the controller 13 to eject the second liquid from the second nozzle groups 30*s* to execute the water repellent treatment before executing printing. For example, it is possible for the controller 13 to discharge the second liquid using the pressure mechanism 39 when the number of times of wiping the first nozzle surfaces 28*f* exceeds a predetermined number of times.

Advantages of Second Embodiment

Advantages of the present embodiment will be described.

(2-1) The liquid ejection unit 17 has the first nozzle surfaces 28*f* and the second nozzle surfaces 28*s*. Specifically, the first nozzle group 30*f* and the second nozzle group 30*s* are disposed on the respective nozzle surfaces 28 different from each other. Therefore, it is possible to reduce the first liquid which adheres to the second nozzle surfaces 28*s*.

(2-2) The wiping unit 18 wipes the second nozzle surfaces 28*s* and the first nozzle surfaces 28*f*. The second liquid having adhered to the second nozzle surfaces 28*s* adheres to the wiping unit 18 when wiping the second nozzle surfaces 28*s*. By wiping the first nozzle surfaces 28*f* with the wiping unit 18 to which the second liquid has adhered, it is possible to easily perform the water repellent treatment of the first nozzle surfaces 28*f*.

(2-3) It is possible for the cleaning mechanism 37 to easily discharge the second liquid from the second nozzle groups 30*s* by pressurizing the second liquid with the pressure mechanism 39.

Third Embodiment

Then, a liquid ejection device and a method of controlling a liquid ejection device according to a third embodiment will be described with reference to the drawings. It should be noted that the third embodiment is different in the point that the cleaning mechanism is provided from the case of the first embodiment. Further, since the third embodiment is substantially the same in other points as the first embodiment, the same elements are denoted by the same symbols to thereby omit the redundant description.

Figure 4:
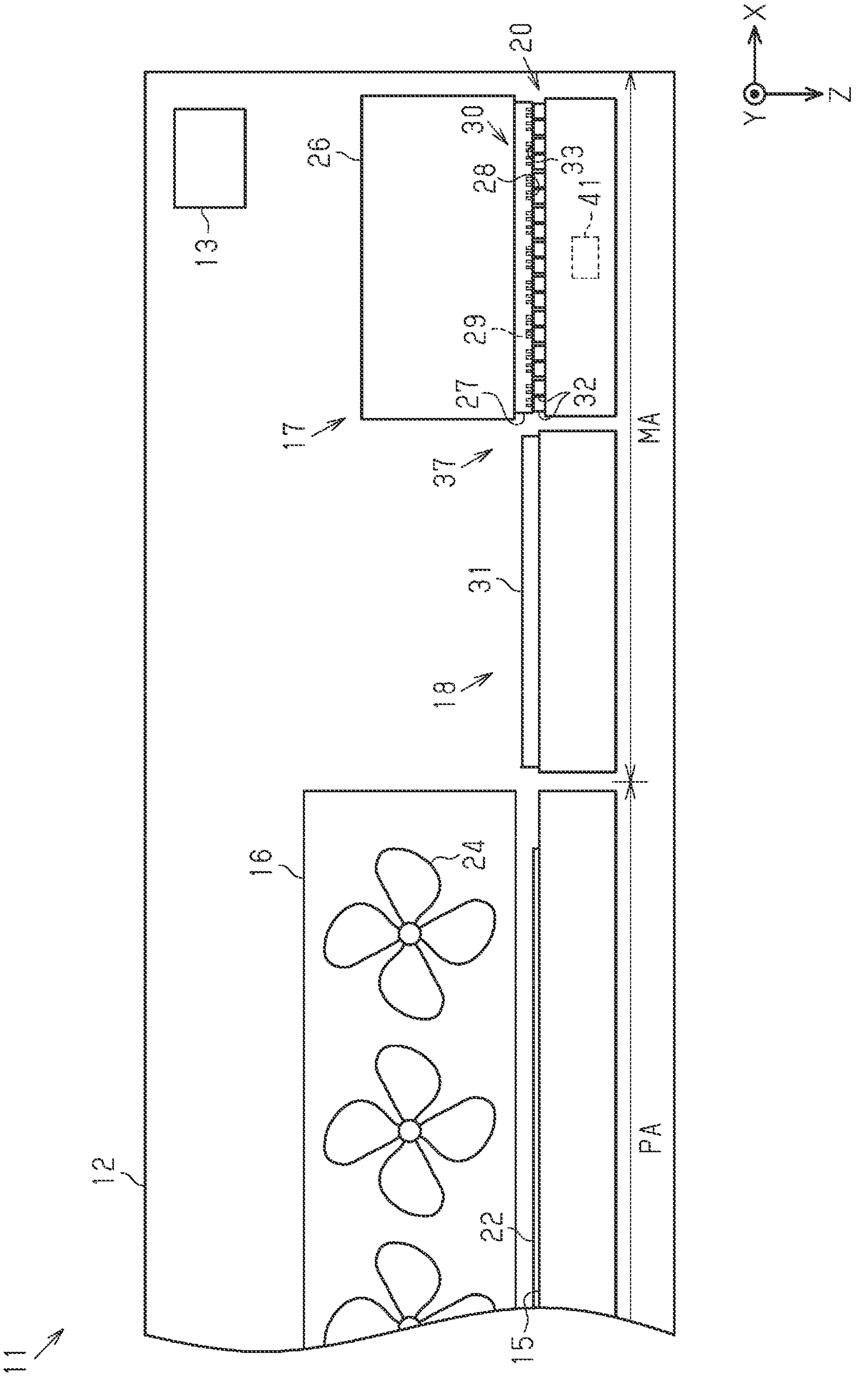
FIG. 4 is a schematic diagram of a third embodiment of the liquid ejection device.

As shown in FIG. 4, the liquid ejection device 11 can be provided with the cleaning mechanism 37. The cleaning mechanism 37 can have the caps 32 and a suction mechanism 41. In other words, the caps 32 provided to the capping unit 20 can function as the cleaning mechanism 37.

It is possible for the liquid ejection unit 17 to be provided with a single head 27. The head 27 has a nozzle surface 28.

Figure 5:
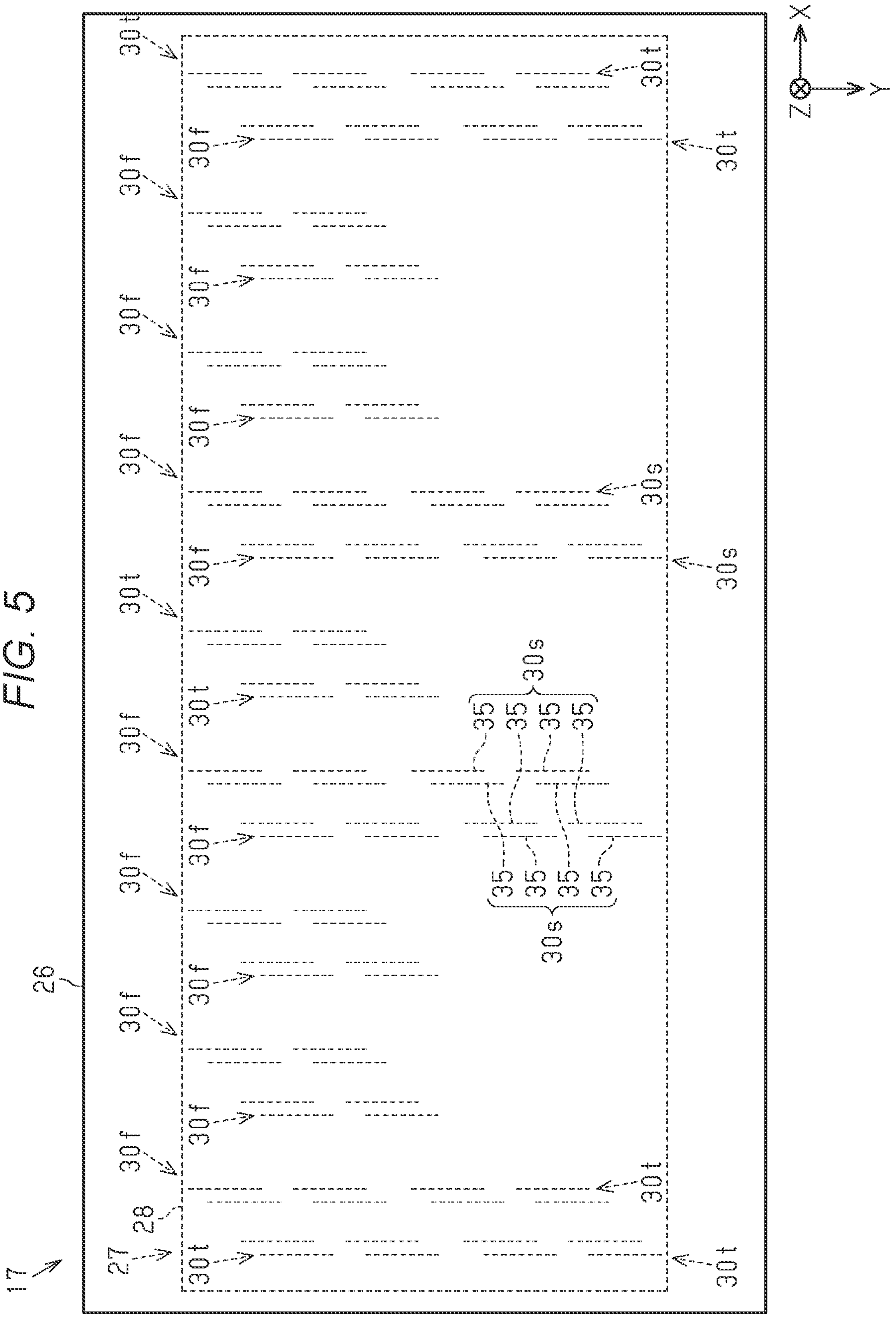
FIG. 5 is a schematic diagram of the liquid ejection unit.

As shown in FIG. 5, the first nozzle groups 30*f* through the third nozzle groups 30*t* can be disposed on the nozzle surface 28 with, for example, substantially the same layout as that of the first embodiment. The first nozzle group 30*f* and the second nozzle group 30*s* can be disposed on the same nozzle surface 28. The first nozzle group 30*f* through the third nozzle group 30*t* can be disposed on the same nozzle surface 28.

The caps 32 make contact with the liquid ejection unit 17 to thereby surround a space where at least the second nozzle group 30*s* opens. The suction mechanism 41 is capable of suctioning the inside of the caps 32. The suction mechanism 41 suctions the inside of the caps 32 surrounding the second nozzle groups 30*s* to thereby discharge the second liquid from the second nozzle groups 30*s*. The second liquid thus discharged adheres to the nozzle surface 28.

Functions of Third Embodiment

The functions of the present embodiment will be described.

The cleaning mechanism 37 discharges the second liquid to make the second liquid adhere to the nozzle surface 28. Specifically, the suction mechanism 41 suctions the second liquid to discharge the second liquid from the second nozzle groups 30*s*. The second liquid thus discharged adheres to the nozzle surface 28 located inside of the caps 32.

When moving the caps 32 to the separated position, the second liquid which adheres to the nozzle surface 28 spreads to the outer side of the range surrounded by the cap 32 to wet the nozzle surface 28. It is possible for the controller 13 to wipe the nozzle surface 28 to spread the second liquid. It is possible for the drying unit 16 to dry the second liquid which has adhered to the nozzle surface 28. It is possible for the controller 13 to perform the water repellent treatment of ejecting the second liquid from the second nozzle groups 30*s* and the water repellent treatment of discharging the second liquid from the second nozzle groups 30*s* at any timing.

Advantages of Third Embodiment

Advantages of the present embodiment will be described.

(3-1) The first nozzle group 30*f* and the second nozzle group 30*s* are disposed on the same nozzle surface 28. Therefore, it is possible to make the second liquid easily adhere to the nozzle surface 28.

(3-2) The cleaning mechanism 37 discharges the second liquid from the second nozzle groups 30*s* to thereby make the second liquid adhere to the nozzle surface 28. Therefore, it is possible to make the second liquid easily adhere to the nozzle surface 28.

(3-3) The caps 32 surround the space where the second nozzle groups 30*s* open. It is possible for the suction mechanism 41 to easily discharge the second liquid from the second nozzle groups 30*s* by suctioning the inside of the caps 32.

Modified Examples

The present embodiment can be put into practice with the following modifications. The present embodiments and the following modified examples can be put into practice while being combined with each other within a range in which they do not technically conflict with each other.

- The drying unit 16 can be disposed in the maintenance area MA. The drying unit 16 can be disposed across the print area PA and the maintenance area MA. The drying unit 16 can be provided to the carriage 26. The drying unit 16 can be disposed above a moving area where the liquid ejection unit 17 moves. The drying unit 16 can be disposed downstream in the conveying direction Y of the moving area where the liquid ejection unit 17 moves.
- The liquid ejection device 11 can be provided with the liquid ejection unit 17 having a single head 27, and the cleaning mechanism 37 having the pressure mechanism 39.
- The liquid ejection device 11 can be provided with the liquid ejection unit 17 having the plurality of heads 27, and the cleaning mechanism 37 having the suction mechanism 41.
- The liquid ejection device 11 can adopt a configuration not provided with the drying unit 16. It is possible to naturally dry the second liquid which has adhered to the nozzle surface 28.
- It is possible for all of the first nozzle groups 30*f* to eject the first liquid which does not include the inorganic pigment.
- It is possible to freely select the heads 27 provided with the second nozzle groups 30*s* out of the plurality of heads 27.
- The wiper 31 can be a wiper made of, for example, rubber. The wiper 31 can flexurally be deformable. It is possible for the wiping unit 18 to wipe the nozzle surface 28 of the liquid ejection unit 17 which passes above the wiping unit 18 by locating the tip of the wiper 31 above the nozzle surface 28.
- In the second embodiment and the third embodiment, when performing the water repellent treatment on the lip parts 33, it is possible for the liquid ejection unit 17 to eject the second liquid in the state of being opposed to the caps 32.
- The wiping unit 18 is not required to perform wiping after performing the water repellent treatment and before the first nozzle groups 30*f* eject the first liquid to the cloth 22.
- The parameters for ejecting the second liquid in the softening treatment and the parameters for ejecting the second liquid in the water repellent treatment can be the same as each other.
- The liquid ejection device 11 can be a liquid ejection device for jetting or ejecting other liquids than the ink. As a state of the liquid to be ejected from the liquid ejection device as a small amount of droplet, there are included a granular droplet, a droplet like a teardrop, and a droplet trailing like a thread. The liquid mentioned here is sufficiently a material which can be ejected from the liquid ejection device. For example, it is sufficient for the liquid to be in a state in which a matter is in a liquid phase, and the liquid includes a fluid body such as a liquid body high or low in viscosity, sol, gel water, other inorganic solvents, an organic solvent, a solution, liquid resin, liquid metal, or metallic melt. The liquid includes not only a liquid as one state of a matter, but also those having particles of a functional material configured with a solid matter such as a pigment or metal particles dissolved, dispersed, or mixed in a solvent. As a representative example of the liquid, there can be cited the ink described in the above embodiments, liquid crystal, and so on. Here, the ink should include a variety of liquid compositions such as common aqueous ink, oil ink, and gel ink, and hot-melt ink. As a specific example of the liquid ejection device, there is cited a device of ejecting a liquid including a material such as an electrode material or a color material in the form of a dispersion material or a solvent material wherein the material is used for manufacturing, for example, a liquid crystal display, an electroluminescence display, a surface emitting display, or a color filter. The liquid ejection device can be a device for ejecting a bioorganic substance to be used for biochip fabrication, a device which is used as a precision pipette, and which ejects a liquid to be a sample, a print device, a micro-dispenser, and so on. The liquid ejection device can be a device for ejecting lubricating oil to a precision machine such as a timepiece or a camera in a pinpoint manner, a device for ejecting, on a substrate, a transparent resin liquid such as ultraviolet curing resin for forming a fine hemispherical lens, an optical lens, and so on used for an optical communication device. The liquid ejection device can be a device for ejecting an etching liquid such as an acid or an alkali for etching a substrate or the like.

Definitions

An expression of "at least one" used in the present specification means "one or more" of desired alternatives. As an example, the expression of "at least one" used in the present specification means "just one of the alternatives" or "both of the two alternatives" when the number of the alternatives is two. As another example, the expression of "at least one" used in the present specification means "just one of the alternatives" or "any combinations of two or more alternatives" when the number of the alternatives is three or more.

SUPPLEMENTARY NOTES

Technical ideas and functions and advantages thereof figured out from the embodiments and the modified examples described above will hereinafter be described.

(A) A liquid ejection device including a liquid ejection unit having a first nozzle group configured to eject a first liquid to a cloth conveyed, and a second nozzle group configured to eject a second liquid to the cloth, and a wiping unit configured to wipe a nozzle surface on which the first nozzle group is disposed, wherein the first liquid is aqueous ink and the second liquid is a liquid including a softening agent, and the second nozzle group is configured to execute a softening treatment of ejecting the second liquid to the cloth, and a water repellent treatment of making the second liquid adhere to the nozzle surface.

According to this configuration, the second nozzle group ejects the second liquid to thereby execute the softening treatment of the cloth and the water repellent treatment of the nozzle surface on which the first nozzle group is disposed. Therefore, it is possible to prevent the deterioration of the water repellency of the nozzle surface.

(B) In the liquid ejection device described in (A), the second nozzle group may perform the water repellent treatment with the second liquid which is ejected as an atomized droplet.

According to this configuration, the second nozzle group performs the water repellent treatment with the atomized second liquid. Since the atomized second liquid is easy to float, it is possible to easily perform the water repellent treatment in a broad range.

(C) In the liquid ejection device described in one of (A) and (B), parameters for ejecting the second liquid from the second nozzle group may be different between the softening treatment and the water repellent treatment.

The easiness of mist generation changes with, for example, the parameters for ejecting the second liquid. According to this configuration, the parameters for ejecting the second liquid from the second nozzle group in the softening treatment, and the parameters for ejecting the liquid from the second nozzle group in the water repellent treatment are different from each other. It is possible for the second nozzle group to eject the second liquid in the ways of ejection suitable for the respective treatments.

(D) In the liquid ejection device described in any one of (A) through (C), the wiping unit may wipe the nozzle surface after the water repellent treatment, and before the first nozzle group ejects the first liquid to the cloth.

According to this configuration, the wiping unit wipes the nozzle surface after performing the water repellent treatment, and before the first nozzle group ejects the first liquid. The second liquid having adhered to the nozzle surface is spread by the wiping. Therefore, it is possible to perform the ejection of the first liquid in the state in which the water repellency of the nozzle surface is enhanced.

(E) In the liquid ejection device described in any one of (A) through (D), defining the nozzle surface as a first nozzle surface, the liquid ejection unit may have a second nozzle surface on which the second nozzle group is disposed.

According to this configuration, the liquid ejection unit has the first nozzle surface and the second nozzle surface. In other words, the first nozzle group and the second nozzle group are disposed on the respective nozzle surfaces different from each other. Therefore, it is possible to reduce the first liquid which adheres to the second nozzle surface.

(F) In the liquid ejection device described in any one of (A) through (E), there may further be included a cleaning mechanism configured to discharge the second liquid from the second nozzle group, wherein the cleaning mechanism may discharge the second liquid to make the second liquid adhere to the second nozzle surface, and the wiping unit may wipe the first nozzle surface after wiping the second nozzle surface.

According to this configuration, the wiping unit wipes the second nozzle surface and the first nozzle surface. The second liquid having adhered to the second nozzle surface adheres to the wiping unit when wiping the second nozzle surface. By wiping the first nozzle surface with the wiping unit to which the second liquid has adhered, it is possible to easily perform the water repellent treatment of the first nozzle surface.

(G) In the liquid ejection device described in any one of (A) through (D), the second nozzle group may be disposed on the nozzle surface.

According to this configuration, the first nozzle group and the second nozzle group are disposed on the same nozzle surface. Therefore, it is possible to make the second liquid easily adhere to the nozzle surface.

(H) In the liquid ejection device described in (G), there may further be included a cleaning mechanism configured to discharge the second liquid from the second nozzle group, wherein the cleaning mechanism may discharge the second liquid to make the second liquid adhere to the nozzle surface.

According to this configuration, the cleaning mechanism discharges the second liquid from the second nozzle group to thereby make the second liquid adhere to the nozzle surface. Therefore, it is possible to make the second liquid easily adhere to the nozzle surface.

(I) In the liquid ejection device described in one of (F) and (H), the cleaning mechanism may include a pressure mechanism configured to pressurize the second liquid to discharge the second liquid from the second nozzle group.

According to this configuration, it is possible for the cleaning mechanism to easily discharge the second liquid from the second nozzle group by pressurizing the second liquid with the pressure mechanism.

(J) In the liquid ejection device described in one of (F) and (H), the cleaning mechanism may include a cap configured to make contact with the liquid ejection unit to thereby surround a space in which the second nozzle group opens, and a suction mechanism configured to suction an inside of the cap.

According to this configuration, the cap surrounds the space where the second nozzle group opens. It is possible for the suction mechanism to easily discharge the second liquid from the second nozzle group by suctioning the inside of the cap.

(K) In the liquid ejection device described in (B), there may further be included a cap configured to make contact with the liquid ejection unit to thereby surround a space in which the first nozzle group opens, wherein the cap may have a lip part configured to make contact with the liquid ejection unit, and the second nozzle group may make the second liquid adhere to the lip part.

When the cap makes contact with the liquid ejection unit, there is a possibility that the liquid ejection unit gets dirty with the first liquid having adhered to the lip part. In this regard, according to this configuration, by making the second liquid adhere to the lip part, it is possible to enhance the water repellency of the lip part. Therefore, it is possible to reduce the first liquid which adheres to the lip part.

(L) In the liquid ejection device described in any one of (A) through (F), the liquid ejection unit may have a plurality of the first nozzle groups, and the second nozzle group may be arranged at a position closer to the first nozzle group configured to eject the first liquid including an inorganic pigment than to the first nozzle group configured to eject the first liquid which does not include the inorganic pigment.

The first liquid including the inorganic pigment is more apt to deteriorate the water repellency of the nozzle surface than the first liquid which does not include the inorganic pigment. In this regard, according to this configuration, the second nozzle group is disposed at the position closer to the first nozzle group capable of ejecting the first liquid including the inorganic pigment than to the first nozzle group capable of ejecting the first liquid which does not include the inorganic pigment. Therefore, it is possible to make it easy to efficiently perform the water repellent treatment on a portion the water repellency of which easily deteriorates.

(M) In the liquid ejection device described in any one of (A) through (L), there may further be included a drying unit configured to dry the second liquid which adheres to the nozzle surface.

According to this configuration, the drying unit dries the second liquid which has adhered to the nozzle surface, and is therefore capable of easily entrenching the water repellent component in the second liquid on the nozzle surface.

(N) A method of controlling a liquid ejection device including a liquid ejection unit having a first nozzle group configured to eject a first liquid to a cloth conveyed, and a second nozzle group configured to eject a second liquid, and a wiping unit configured to wipe a nozzle surface on which the first nozzle group is disposed, wherein the first liquid is aqueous ink and the second liquid is a liquid including a softening agent, the method including executing, by the second nozzle group, a softening treatment of ejecting the second liquid to the cloth, and executing, by the second nozzle group, a water repellent treatment of ejecting the second liquid to make the second liquid adhere to the nozzle surface.

According to this method, substantially the same advantages as those of the liquid ejection device described above can be exerted.

What is claimed is:

1. A liquid ejection device comprising:

a liquid ejection unit having a first nozzle group configured to eject a first liquid to a cloth conveyed, and a second nozzle group configured to eject a second liquid to the cloth; and a wiping unit configured to wipe a nozzle surface on which the first nozzle group is disposed, wherein the first liquid is aqueous ink and the second liquid is a liquid including a softening agent, the second nozzle group is configured to execute a softening treatment of ejecting the second liquid to the cloth, and a water repellent treatment of making the second liquid adhere to the nozzle surface, and the second nozzle group performs the water repellent treatment with the second liquid which is ejected as an atomized droplet.

2. The liquid ejection device according to claim 1, wherein parameters for ejecting the second liquid from the second nozzle group are different between the softening treatment and the water repellent treatment.

3. The liquid ejection device according to claim 1, wherein the wiping unit wipes the nozzle surface after the water repellent treatment, and before the first nozzle group ejects the first liquid to the cloth.

4. The liquid ejection device according to claim 1, wherein defining the nozzle surface as a first nozzle surface, the liquid ejection unit has a second nozzle surface on which the second nozzle group is disposed.

5. The liquid ejection device according to claim 4, further comprising:

a cleaning mechanism configured to discharge the second liquid from the second nozzle group, wherein the cleaning mechanism discharges the second liquid to make the second liquid adhere to the second nozzle surface, and the wiping unit wipes the first nozzle surface after wiping the second nozzle surface.

6. The liquid ejection device according to claim 1, wherein the second nozzle group is disposed on the nozzle surface.

7. The liquid ejection device according to claim 6, further comprising:

a cleaning mechanism configured to discharge the second liquid from the second nozzle group, wherein the cleaning mechanism discharges the second liquid to make the second liquid adhere to the nozzle surface.

8. The liquid ejection device according to claim 5, wherein the cleaning mechanism includes a pressure mechanism configured to pressurize the second liquid to discharge the second liquid from the second nozzle group.

9. The liquid ejection device according to claim 5, wherein the cleaning mechanism includes a cap configured to make contact with the liquid ejection unit to thereby surround a space in which the second nozzle group opens, and a suction mechanism configured to suction an inside of the cap.

10. The liquid ejection device according to claim 1, further comprising:

a cap configured to make contact with the liquid ejection unit to thereby surround a space in which the first nozzle group opens, wherein the cap has a lip part configured to make contact with the liquid ejection unit, and the second nozzle group makes the second liquid adhere to the lip part.

11. The liquid ejection device according to claim 1, wherein the liquid ejection unit has a plurality of the first nozzle groups that eject a plurality of first liquids, and the second nozzle group is arranged at a position closer to a first one of the plurality of the first nozzle groups that is configured to eject a first one of the plurality of the first liquids including an inorganic pigment than to a second one of the plurality of the first nozzle groups that is configured to eject a second one of the plurality of the first liquids which does not include the inorganic pigment.

12. The liquid ejection device according to claim 1, further comprising:

a drying unit configured to dry the second liquid which adheres to the nozzle surface.

13. A method of controlling a liquid ejection device including a liquid ejection unit having a first nozzle group configured to eject a first liquid to a cloth conveyed, and a second nozzle group configured to eject a second liquid to the cloth, and a wiping unit configured to wipe a nozzle surface on which the first nozzle group is disposed, wherein the first liquid is aqueous ink and the second liquid is a liquid including a softening agent, the method comprising:

executing, by the second nozzle group, a softening treatment of ejecting the second liquid to the cloth; and executing, by the second nozzle group, a water repellent treatment of ejecting the second liquid to make the second liquid adhere to the nozzle surface, wherein the second nozzle group performs the water repellent treatment with the second liquid which is ejected as an atomized droplet.

* * * * *